(12) United States Patent
Nishio

(10) Patent No.: US 10,212,307 B2
(45) Date of Patent: Feb. 19, 2019

(54) DATA TRANSMISSION SYSTEM AND DATA TRANSMISSION METHOD

(71) Applicant: KYOCERA Document Solutions Inc., Osaka (JP)

(72) Inventor: Takatoshi Nishio, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/881,755

(22) Filed: Jan. 27, 2018

(65) Prior Publication Data
US 2018/0220036 A1    Aug. 2, 2018

(30) Foreign Application Priority Data

Jan. 27, 2017  (JP) ................. 2017-012916

(51) Int. Cl.
  *H04N 1/00* (2006.01)
  *H04N 1/32* (2006.01)
(52) U.S. Cl.
  CPC ..... *H04N 1/32683* (2013.01); *H04N 1/00244* (2013.01); *H04N 1/00344* (2013.01); *H04N 1/32406* (2013.01); *H04N 2201/0094* (2013.01)
(58) Field of Classification Search
  CPC .......... H04N 5/23241; H04N 5/23287; H04N 1/00978; H04N 1/40037; H04N 2201/0082; H04N 5/23203; H04N 5/23206; H04N 5/23245; H04N 5/23258; H04N 5/23274; H04N 5/247; H04N 5/3572; H04N 7/181; H04N 7/185; H04N 7/186

USPC ................. 358/1.15, 1.14, 474, 47
See application file for complete search history.

(56) References Cited

U.S. PATENT DOCUMENTS

| 5,136,663 | A | * | 8/1992 | Nishio | ................. G06T 9/008 348/422.1 |
| 2002/0094206 | A1 | * | 7/2002 | Igarashi | ............... G03D 15/001 399/8 |
| 2003/0076418 | A1 | * | 4/2003 | Nishio | ................. H04N 17/004 348/180 |
| 2010/0268481 | A1 | * | 10/2010 | Lee | ..................... G06F 11/3034 702/34 |
| 2012/0013721 | A1 | * | 1/2012 | Nishio | .................. H04R 25/00 348/61 |

(Continued)

FOREIGN PATENT DOCUMENTS

JP   2008-300920 A    12/2008

*Primary Examiner* — Negussie Worku
(74) *Attorney, Agent, or Firm* — Hawaii Patent Services; Nathaniel K. Fedde; Kenton N. Fedde

(57) ABSTRACT

Provided is a data transmission system that accurately performs transmitting and receiving of job data. A cloud server transmits job data, a vibration-detection sensor of a gateway detects vibration that is applied to the gateway, a vibration-detection sensor of an MFP detects vibration that is applied to the MFP, the gateway stores job data that is received from the cloud server in memory of the gateway, and then transmits the job data to the MFP. Moreover, the gateway, when the value of vibration-detection data of the vibration-detection sensor is equal to or less than a specified threshold value, stores the job data from the cloud server in memory, and when the value of vibration-detection data of the vibration-detection sensor equal to or less than a specified vale, transmits the job data that is stored in memory to the MFP.

5 Claims, 6 Drawing Sheets

(56) References Cited

U.S. PATENT DOCUMENTS

| | | | |
|---|---|---|---|
| 2012/0268789 A1* | 10/2012 | Yamada | H04N 1/00029 358/1.16 |
| 2015/0062030 A1* | 3/2015 | Gao | G06F 3/0488 345/173 |
| 2016/0011663 A1* | 1/2016 | Starner | G06F 1/163 340/407.2 |
| 2017/0209338 A1* | 7/2017 | Potucek | A61H 33/005 |
| 2017/0246565 A1* | 8/2017 | Miyaji | B01D 35/143 |
| 2017/0269872 A1* | 9/2017 | Chuang | G06F 13/28 |
| 2017/0366683 A1* | 12/2017 | Nishio | H04N 1/00015 |
| 2018/0198927 A1* | 7/2018 | Nishio | G06F 3/0604 |

\* cited by examiner

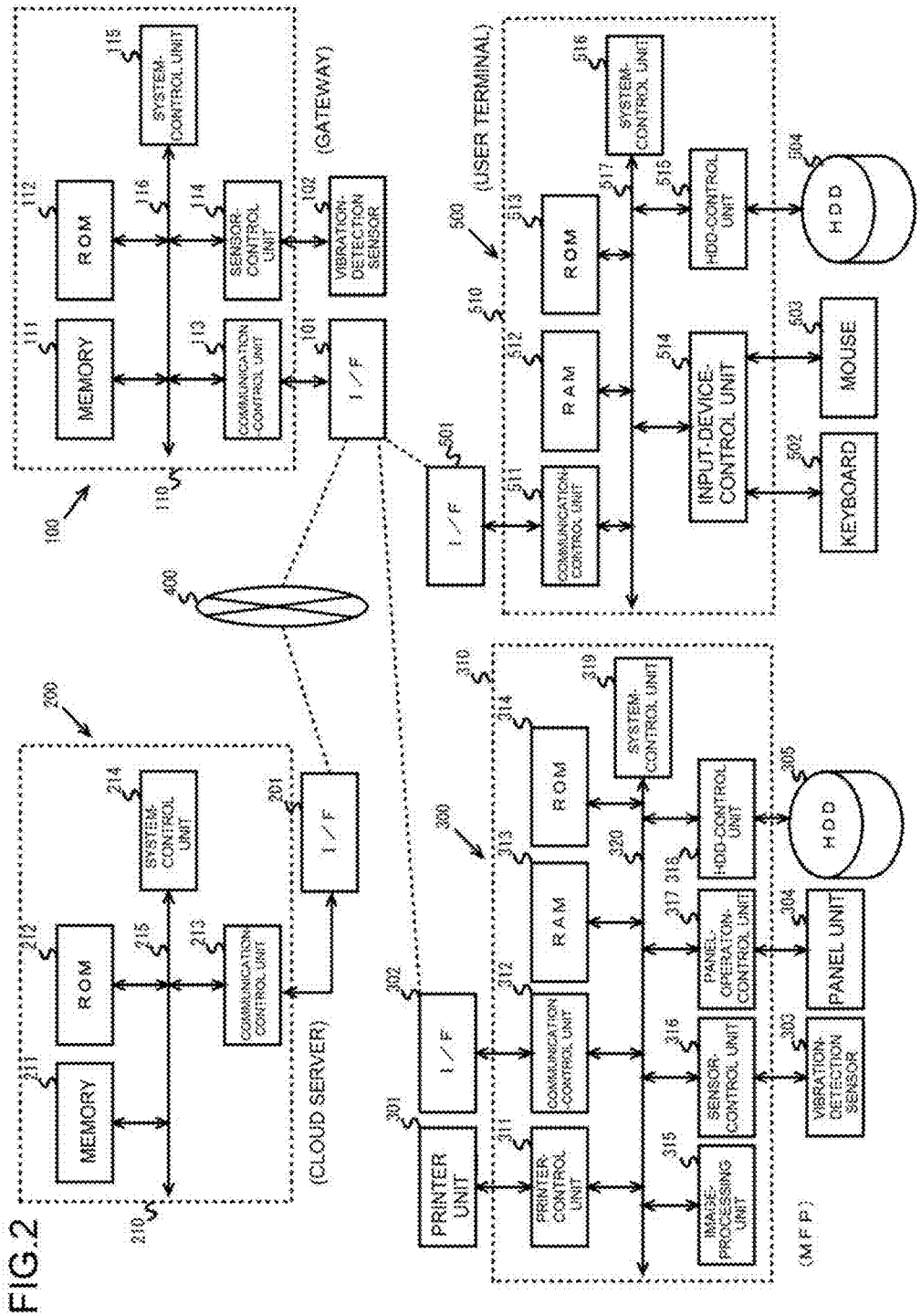

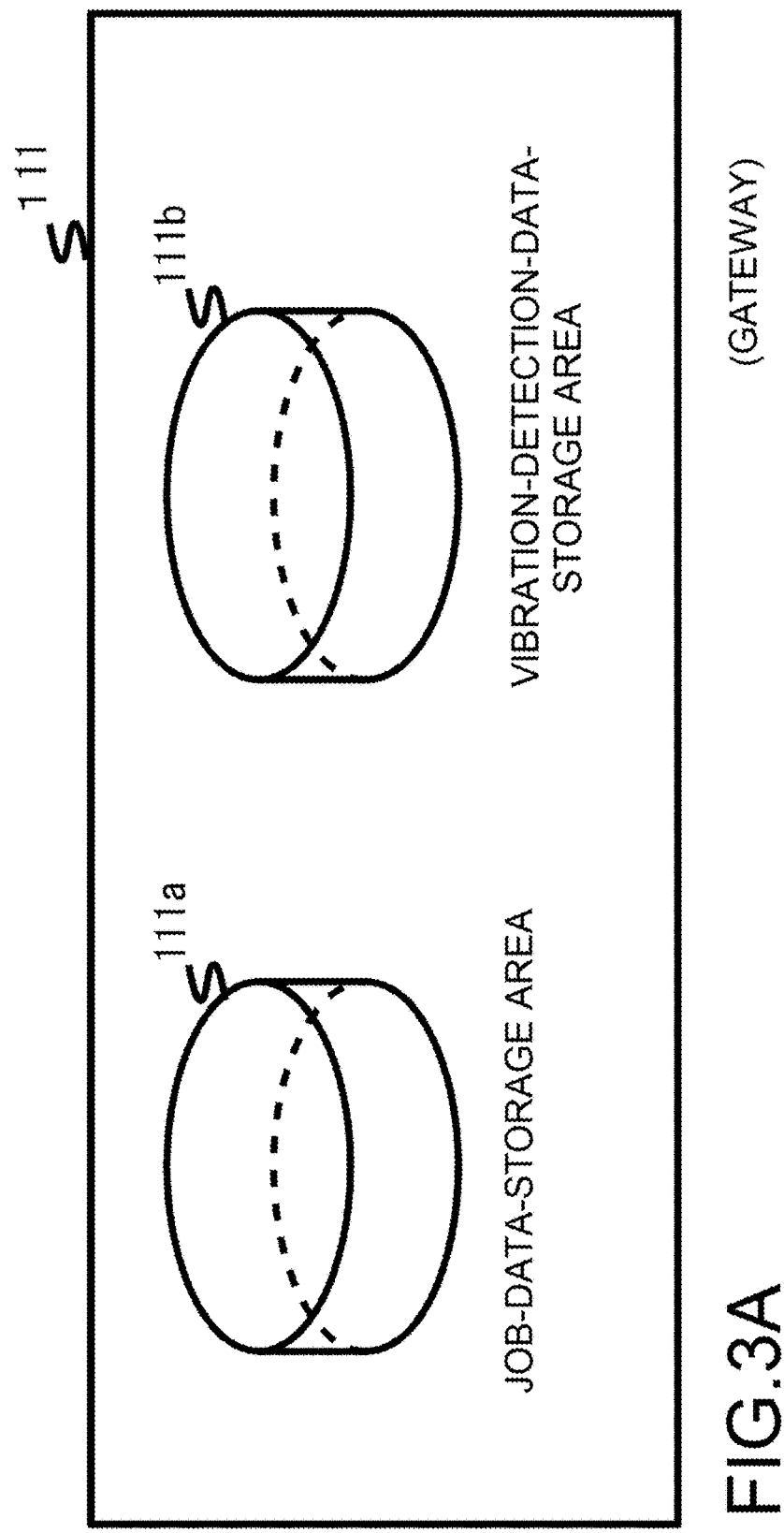

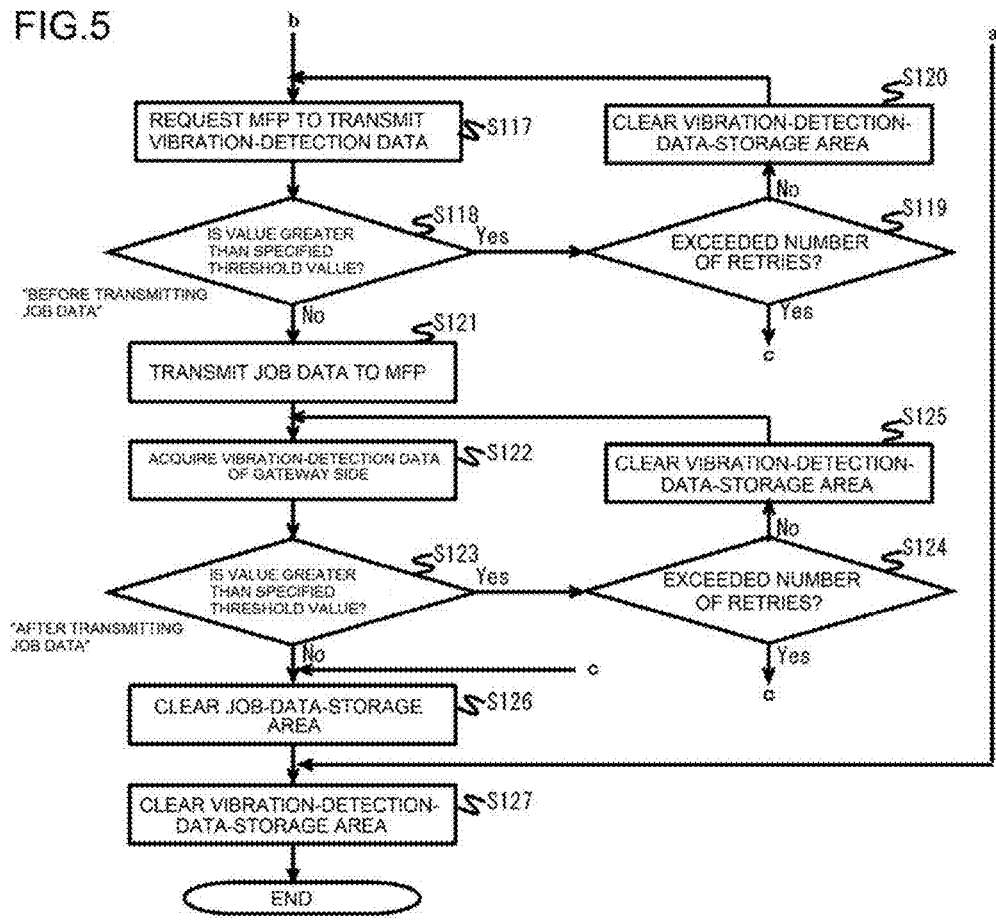

DATA TRANSMISSION SYSTEM AND DATA TRANSMISSION METHOD

INCORPORATION BY REFERENCE

This application is based on and claims the benefit of priority from Japanese Patent Application No. 2017-012916 filed on Jan. 27, 2017, the contents of which are hereby incorporated by reference.

BACKGROUND

The present disclosure relates to a data transmission system and data transmission method that are suitable for transmitting and receiving data.

A printing function, copying function, FAX (facsimile) function, a data transmitting/receiving function via a network, and the like are mounted, for example, in an image forming apparatus such as a MFP (Multifunction Peripheral) and the like. Moreover, in this kind of image forming apparatus, there are models in which an HDD (Hard Disk Drive) is mounted in order to achieve multi operation of various jobs such as copying, printing, FAX and the like, or to achieve a user box function. Incidentally, an HDD has an advantage in that the storage capacity is large, however, has a disadvantage in that an HDD is vulnerable to vibration. Furthermore, when trouble occurs in the HDD due to vibration and the like, it may not be possible to perform writing and reading of data properly.

As a way to eliminate this kind of trouble, in typical technology, there is an image processing apparatus that has a vibration-detection sensor that determines whether or not there is vibration that will affect the HDD, and a storage controller that causes information to be stored in the HDD. In this image processing apparatus, when the vibration-detection sensor detects vibration, the storage controller switches the information storage destination from the HDD to a nonvolatile memory.

SUMMARY

A data transmission system according to the present disclosure includes a server, a relay apparatus and an image forming apparatus. The server transmits job data. The relay apparatus has a first storage device and a first vibration-detection sensor. The image forming apparatus has a second vibration-detection sensor. The first vibration-detection sensor detects vibration that is applied to the relay apparatus. The second vibration-detection sensor detects vibration that is applied to the image forming apparatus. The relay apparatus stores the job data that is received from the server in the first storage device, and then transmits the job data to the image forming apparatus. The image forming apparatus transmits vibration-detection data of the second vibration-detection sensor to the relay apparatus in accordance with a request from the relay apparatus. The relay apparatus, when the value of vibration-detection data of the first vibration-detection sensor is equal to or less than a specified threshold value, receives the job data from the server and stores the job data in the first storage device. Moreover, the relay apparatus, when the value of vibration-detection data of the second vibration sensor is equal to or less than a specified value, transmits the job data that is stored in the first storage device to the image forming apparatus.

A data transmission method according to the present disclosure has: transmitting, via a server, job data; detecting, via a first vibration-detection sensor of a relay apparatus, vibration that is applied to the relay apparatus; detecting, via a second vibration-detection of an image forming apparatus, vibration that is applied to the image forming apparatus; and storing, via the relay apparatus, the job data that is received from the server in a first storage device of the relay apparatus, and then transmitting the job data to the image forming apparatus. The image forming apparatus transmits vibration-detection data of the second vibration-detection sensor to the relay apparatus in accordance with a request from the relay apparatus. The relay apparatus, when the value of vibration-detection data of the first vibration-detection sensor is equal to or less than a specified threshold value, receives the job data from the server and stores the job data in the first storage device. Moreover, the relay apparatus, when the value of vibration-detection data of the second vibration sensor is equal to or less than a specified value, transmits the job data that is stored in the first storage device to the image forming apparatus.

BRIEF DESCRIPTION OF THE DRAWINGS

FIG. 2 illustrates an example of configuration of the gateway, cloud server, MFP and user terminal in FIG. 1

FIG. 3A illustrates an example of the storage area inside the gateway and cloud server memory in FIG. 1, and illustrates the job-data-storage area and the vibration-detection-data-storage area inside the gateway memory.

FIG. 5 is a flowchart for explaining the data transmission method in the data transmission system in FIG. 1.

DETAILED DESCRIPTION

In the following, an embodiment of the data transmission system according to the present disclosure will be explained with reference to FIG. 1 to FIG. 5. As an example of an image forming apparatus that is included in the data transmission system in the explanation below will be a MFP (Multifunction Peripheral) this is a combined peripheral apparatus in which, for example, a printing function, a copying function, a FAX function and a data transmitting/receiving function via a network and the like are installed.

Figure 1:
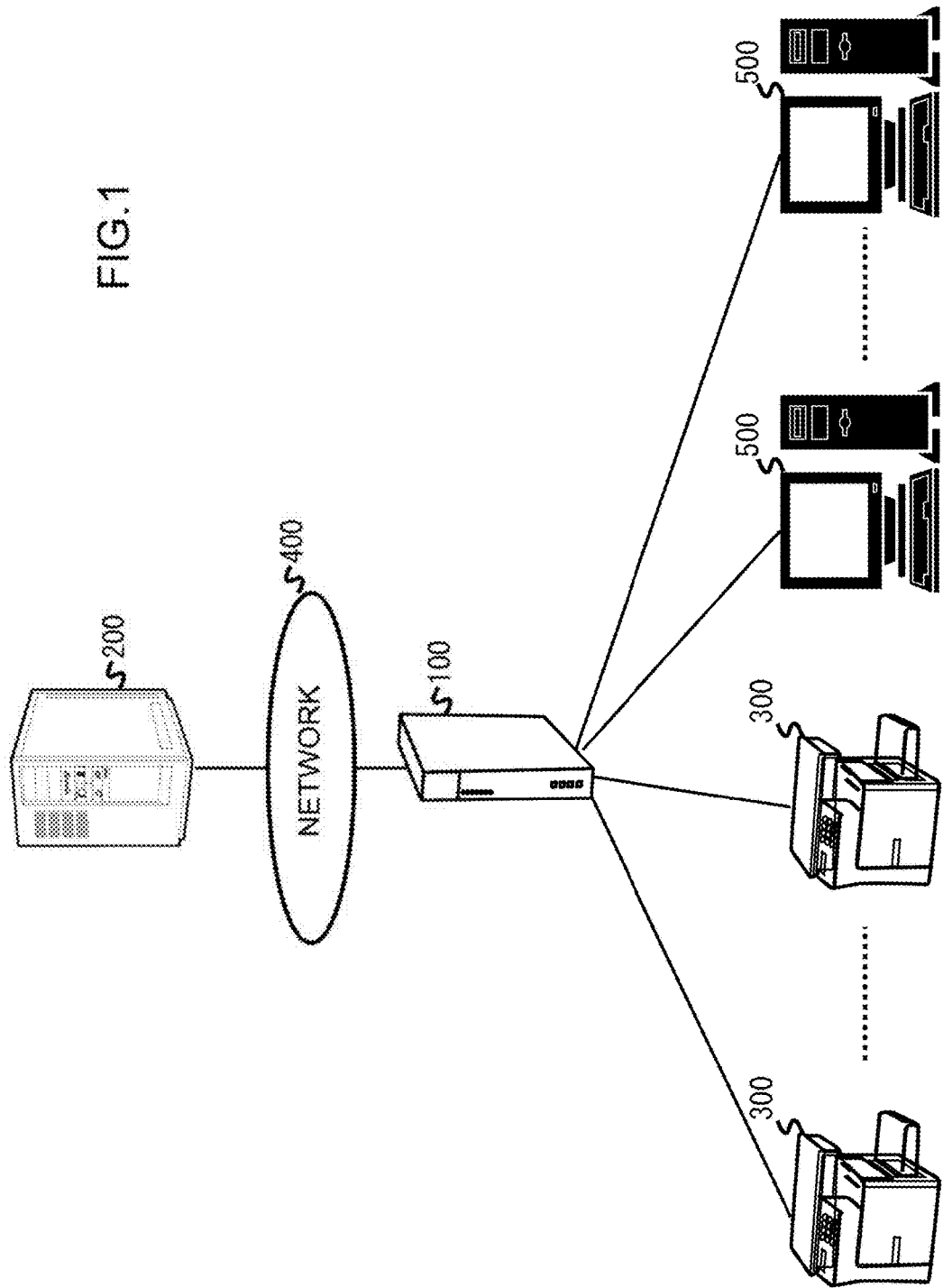
FIG. 1 illustrates an embodiment of a data transmission system according to the present disclosure.

First, as illustrated in FIG. 1, the data transmission system includes a gateway 100 that is a relay apparatus, a cloud server 200 and MFPs 300. Reference number 500 indicates a user terminals such as a PC (Personal Computer) or the like that is capable of registering job data such as for a printing job in a MFP 300 or the cloud server 200. The MFPs 300 and user terminals 500 are connected via the gateway 100. The gateway 100 and the cloud server 200 are connected via a network 400. Moreover, there can be one or plural MFPs 300 and user terminals 500. Furthermore, the relay apparatus may be a document-management server or a system-management server.

Here, when there is a transmission request from an MFP 300 for job data such as that of a printing job or the like, the gateway 100 sends the job data transmission request to the cloud server 200. Moreover, as will be described in detail later, the gateway 100, based on vibration-detection data that indicates a value that is detected by a vibration-detection sensor 102 illustrated in FIG. 2 described later, determines whether or not to have job data be re-transmitted from the cloud server 200. Furthermore, the gateway 100, based on vibration-detection data that indicates a value that is detected by a vibration-detection sensor 303 of the MFP 300 illustrated in FIG. 2 described later, determines whether or not to re-transmit job data to the MFP 300.

When there is a transmission request from the gateway 100 for job data, the cloud server 200 transmits job data to the gateway 100. The MFP 300 receives the job data from the gateway 100. Moreover, when there is a transmission request for vibration-detection data that indicates a value detected by the vibration-detection sensor 303 illustrated in FIG. 2 described later, the MFP 300 transmits vibration-detection data of the vibration-detection sensor 303 to the gateway 100.

Figure 3B:
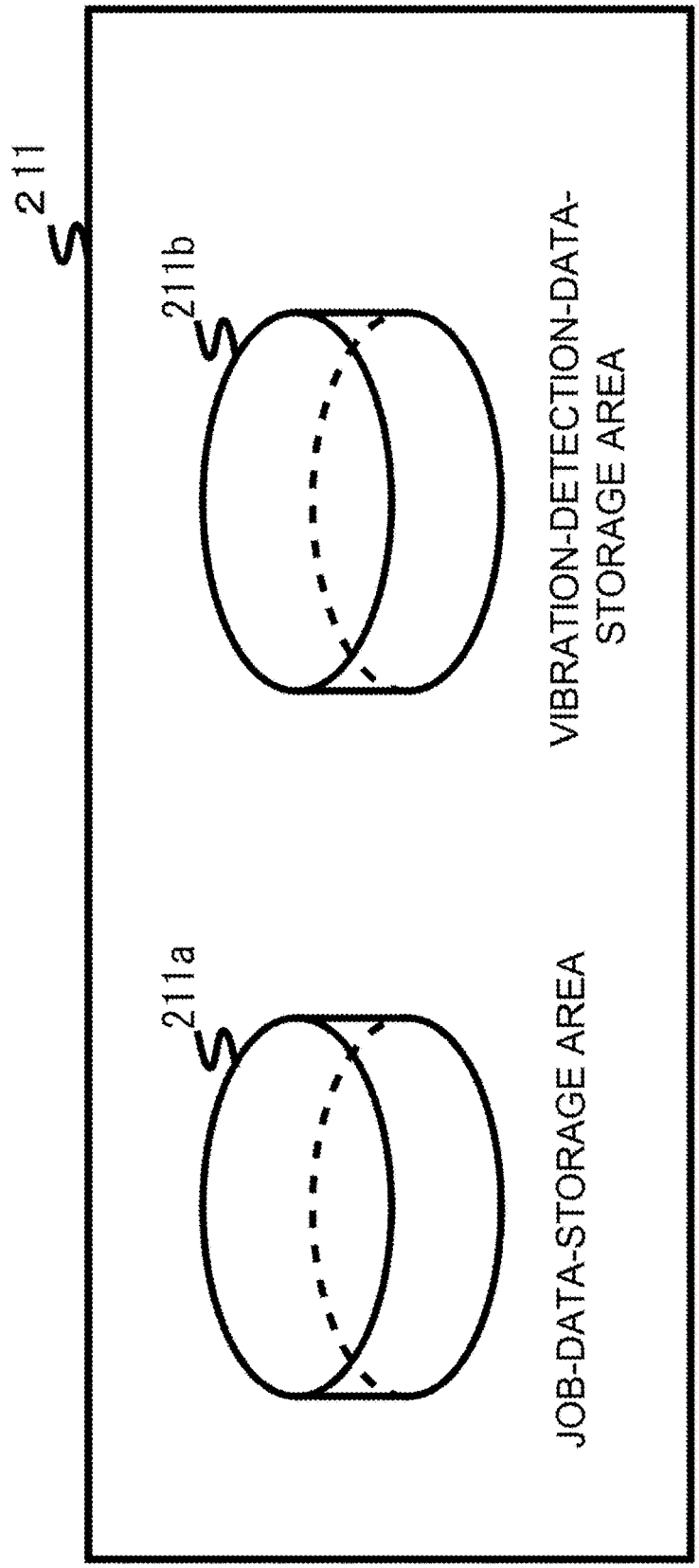
FIG. 3B illustrates an example of the storage area inside the gateway and cloud server memory in FIG. 1, and illustrates the job-data-storage area and the vibration-detection-data-storage area inside the cloud server memory.

Next, an example of configuration of the gateway 100, the cloud server 200, a MFP 300 and a user terminal 500 will be explained with reference to FIG. 2 to FIG. 3B. First, the gateway 100 includes a control unit 110 that controls an I/F 101 and a vibration-detection sensor 102. The I/F 101 takes charge of communication with a MFP 300, a user terminal 500 and the like. Moreover, the I/F 101 takes charge of communication with the cloud server 200 via the network 400. The I/F 101, via the network 400, may also take charge of communication with a content server, a web server and the like. The vibration-detection server 102 detects vibration that is applied to the gateway 100. More specifically, the vibration-detection sensor 102 is installed on at least one site of the main body of the gateway 100, I/F 101, memory 111, ROM 112, communication-control unit 113, sensor-control unit 114 and system-control unit 115 of the gateway 100, and detects vibration that is applied to the site that is the target of detection.

The control unit 110 is a processor that controls the overall operation of the gateway 100 by executing application programs and a control program. The control unit 110 includes a memory 111, a ROM (Read-Only Memory) 112, a communication-control unit 113, a sensor-control unit 114, and a system-control unit 115. Moreover, these units are connected to a data bus 116.

The memory 111 is a work memory for executing programs. Moreover, the memory 111, as illustrated in FIG. 3A, has a job-data-storage area 111a, and a vibration-detection-data-storage area 111b. The job-data-storage area 111a stores job data and the like that is received from the cloud server 200 or a user terminal 500. The vibration-detection-data-storage area 111b stores vibration-detection data that is detected by the vibration-detection sensor 102, and vibration-detection data that is detected by the vibration-detection sensor 303 of the MFP 300.

Here, the gateway 100 transmits job data of a printing job or the like from a user terminal 500, for example, to the cloud server 200 or the MFP 300. Moreover, the gateway 100 temporarily registers job data that is received from the cloud server 200 in the job-data-storage area 111a, and transmits the job data to the MFP 300.

The ROM 112 stores a control program that performs operation checks and the like of each of the units. The communication-control unit 113, via the I/F 101, performs control of transmitting and receiving data and the like between an MFP 300 and a user terminal 500. Moreover, the communication-control unit 113, via the I/F 101, performs control of transmitting and receiving data via the network 400. The sensor-control unit 114 controls the detection operation of the vibration-detection sensor 102, and notifies the system-control unit 115 of the vibration-detection data of the vibration-detection sensor 102.

The system-control unit 115 controls cooperative operation and the like of each of the units. Moreover, the system-control unit 115 causes job data and the like from the cloud server 200 to be stored in the job-data-storage area 111a. Furthermore, the system-control unit 115 causes vibration-detection data that is detected by the vibration-detection sensor 102, and vibration-detection data that is detected by the vibration-detection sensor 303 of the MFP 300 to be stored in the vibration-detection-data-storage area 111b. The system-control unit 115 determines whether or not the vibration-detection data that is detected by the vibration-detection sensor 102 is equal to or less than a specified threshold value, and when the vibration-detection data is equal to or less than a specified threshold value, the system-control unit 115 sends a transmission request for job data to the cloud server 200. Here, the specified threshold value can be arbitrarily set, however, for example, may be set based on a standard value of vibration resistance or impact resistance at each site (for example, main body, HDD 305, or the like of the gateway 100) that is a target of detection by the vibration-detection sensor 102 that is installed in the gateway 100. Moreover, the system-control unit 115 determines whether or not the vibration-detection data that is detected by the vibration-detection sensor 303 of the MFP 300 is equal to or less than a specified threshold value, and when the vibration-detection value is equal to or less than a specified threshold value, the system-control unit 115 transmits job data that is received from the cloud server 200 to the MFP 300. Here, the specified threshold value can be arbitrarily set, however, for example, may be set based on a standard value of vibration resistance or impact resistance at each site (for example, main body, HDD 305, or the like of the MFP 300) that is a target of detection by the vibration-detection sensor 303 that is installed in the MFP 300.

The cloud server 200 includes a control unit 210 that controls the I/F 201. The I/F 201 takes charge of communication with the gateway 100 via the network 400. The control unit 210 is a processor that controls the overall operation of the cloud server 200 by executing application programs, a control program and the like. The control unit 210 includes a memory 211, a ROM 212, a communication-control unit 213, and a system-control unit 214. Moreover, these units are connected to a data bus 215.

The memory 211 is a work memory for executing programs. Moreover, the memory 211, as illustrated in FIG. 3B, has, for example, a job-data-storage area 211a that stores job data and the like that is received from the user terminal 500, and a vibration-detection-data-storage area 211b that stores vibration-detection data that is received from the gateway 100. The vibration-detection-data-storage area 211b may be omitted.

The ROM 212 stores a control program that performs operation checks and the like of each unit. The communication-control unit 213, via the I/F 201, performs control of transmitting and receiving data and the like to and from the gateway 100 via the network 400. Moreover, the communication-control unit 213 performs control of transmitting and receiving data and the like to and from the MFP 300 and the user terminal 500 via the network 400.

The system-control unit 214, for example, stores job data from the user terminal 500 or vibration-detection data from the gateway 100 in the job-data-storage area 211a, or vibration-detection-data-storage area 211b of the memory 211. Moreover, the system-control unit 214 transmits job data and the like that is stored in the job-data-storage area 211a according to a job-data-transmission request from the gateway 100.

The MFP 300 includes a control unit 310 that controls a printer unit 301, an I/F 302, a vibration-detection sensor 303, a panel unit 304, and a HDD (Hard Disk Drive) 305. The MFP 300 may also include a scanner unit, a FAX unit and the like.

The printer unit 301 is a device that prints an image on paper based on printing data that is outputted from the control unit 310. The I/F 302 takes charge of communication with other MFPs 300, user terminals 500 and the like via the gateway 100. The I/F 302 may also take charge of communication with a content server, web server and the like via the gateway 100.

The vibration-detection sensor 303 detects vibration that is applied to the MFP 300. More specifically, the vibration-detection sensor 303 is installed in at least one site of the main body of the MFP 300, the printer unit 301, the I/F 302, the panel unit 304, the HDD 305, the printer-control unit 311, the communication-control unit 312, the RAM 313, the ROM 314, the image-processing unit 315, the sensor-control unit 316, the panel-operation-control unit 317, the HDD-control unit 318, and the system-control unit 319. Then, the vibration-detection sensor 303 detects vibration that is applied to a site that is a detection target.

The panel unit 304 is a device such as a touch panel that performs a display for the printing function, copying function, the FAX function, the data transmitting/receiving function via a network and for various settings of the MFP 300. The HDD 305 is a storage device that stores application programs and the like for providing the various functions of the MFP 300. Moreover, the HDD 305 has user boxes that store printing jobs that are registered from user terminals 500, for example.

The control unit 310 is a processor that controls the overall operation of the MFP 300 by executing an image forming program, a control program and the like. The control unit 310 includes a printer-control unit 311, a communication-control unit 312, a RAM (Random Access Memory) 313, a ROM 314, an image-processing unit 315, a sensor-control unit 316, a panel-operation-control unit 317, an HDD-control unit 318, and a system-control unit 319. Moreover, these units are connected to a data bus 320.

The printer-control unit 311 controls the printing operation of the printer unit 301. The communication-control unit 312, via the I/F 302, performs control of transmitting and receiving data and the like via the gateway 100. The RAM 313 is a work memory for executing programs. The ROM 314 stores a control program for performing operation checks and the like of each of the units. The image-processing unit 315 performs image processing (rasterization) of a printing job that is registered in a user box of the HDD 305, for example. The system-control unit 319 temporarily stores printing data that has undergone image processing by the image-processing unit 315 in the RAM 313. Moreover, the system-control unit 319 temporarily stores vibration-detection data that is detected by the vibration-detection sensor 303 in the RAM 313.

The sensor-control unit 316 controls the detection operation of the vibration-detection sensor 303, and notifies the system-control unit 319 of the vibration-detection data of the vibration-detection sensor 303. The panel-operation-control unit 317 controls the display operation of the panel unit 304. Moreover, the panel-operation-control unit 317, via the panel unit 304, receives settings and the like for starting printing, copying, FAX, data transmitting/receiving via the gateway 100 and the like. The HDD-control unit 318 controls reading data from and writing data to the HDD 305.

The system-control unit 319 causes the HDD-control unit 318 to registers job data that is received from the gateway 100 in a user box, for example, of the HDD 305. Moreover, the system-control unit 319 transmits vibration-detection data of the vibration-detection sensor 303 to the gateway 100 according to a gateway 100 request.

The user terminal 500 includes a control unit 510 that controls an I/F (interface) 501, a keyboard 502, a mouse 503, and a HDD 504. The I/F 501 takes charge of communication with the cloud server 200, other MFPs 300 and other user terminals 500 via the gateway 100. The I/F 501 may also take charge of communication with a content server, web server and the like via the gateway 100. The keyboard 502 is an input device that inputs characters and the like to the control unit 510. The mouse 503 is an input device that gives instructions such as the input position to the control unit 510. The HDD 504 is a storage device that stores application programs and the like for providing various functions of the user terminal 500.

The control unit 510 is a processor that controls the overall operation of the user terminal 500 by executing application programs, a control program and the like. The control unit 510 includes a communication-control unit 511, a RAM 512, a ROM 513, and input-device-control unit 514, a HDD-control unit 515 and a system-control unit 516. Moreover, these units are connected to a data bus 517.

The communication-control unit 511, via the I/F 501, performs control of transmitting and receiving data and the like via the gateway 100. The RAM 512 is a work memory for executing programs. The ROM 513 stores a control program that performs operation checks and the like of each of the units. The input-device-control unit 514 controls the input operation of the keyboard 502 and the mouse 503, and delivers the input signals of the keyboard 502 and the mouse 503 to the control unit 510. The HDD-control unit 515 controls reading data from and writing data to the HDD 504.

The system-control unit 516 controls cooperative operation and the like of each of the units. Moreover, when there is an instruction via the keyboard 502 or the mouse 503 to register data such as job data in the MFP 300 or the cloud server 200, the system-control unit 516 transmits job data and the like to the gateway 100 via the I/F 501.

Next, the data-transmission method in the data-transmission system will be explained with reference to FIG. 4 and FIG. 5. In the following, the explanation will center on processing by the gateway 100. Moreover, it is presumed that job data and the like that is requested by the MFP 300 is stored in the job-data-storage area 211a of the cloud server 200 in FIG. 3B. Furthermore, a number of retries explained below is the number of times that it is determined whether or not vibration-detection data of the vibration-detection sensor 102, 303 is larger than a threshold value. Moreover, an upper limit (limit number of times) is provided for the number retries. The limit number of times can be arbitrarily set, however, will be explained as being 2 times in the following explanation.

(Step S101)

First, the system-control unit 115 determines whether or not there is a transmission request for job data from an MFP 300.

In this case, when there is no notification from the communication-control unit 113 indicating that a transmission request for job data has been received from a MFP 300, the system-control unit 115 determines that there is no transmission request for job data from an MFP 300 (step S101: NO).

However, when there is a notification from the communication-control unit 113 indicating that a transmission request for job data has been received from a MFP 300, the system-control unit 115 determines that there is a transmission request for job data from an MFP 300 (step S101: YES), and processing moves to step S102.

(Step S102)

The system-control unit 115 acquires vibration-detection data on the gateway 100 side.

In this case, the system-control unit 115, via the sensor-control unit 114, acquires vibration-detection data that is detected by the vibration-detection sensor 102.

Moreover, the system-control unit 115 stores the acquired vibration-detection data in the vibration-detection-data-storage area 111*b* of the memory 111.

(Step S103)

The system-control unit 115 determines whether or not the value of the acquired vibration-detection data is larger than a specified threshold value.

In this case, when the system-control unit 115 determines that the value of the acquired vibration-detection data is larger than a specified threshold value (step S103: YES), processing moves to step S104.

However, when the system-control unit 115 determines that the value of the acquired vibration-detection data is equal to or less than a specified threshold value (step S103: NO), processing moves to step S106.

Here, determination of the value of the vibration-detection data is a process performed before receiving job data from the cloud server 200, and based on the value of the vibration-detection data on the gateway 100 side, this is a criterion for determining whether or not job data can be accurately received from the cloud server 200.

(Step S104)

The system-control unit 115 determines whether or not the number of retries is greater than the limit number of times.

In this case, in the stage before receiving job data from the cloud server 200, when it is the first time for determining whether or not the value of the acquired vibration-detection data is larger than a specified threshold value, the system-control unit 115 determines that the number of retries is not greater than the limit number of times (step S104: NO). Then, processing moves to step S105.

However, in the stage before receiving job data from the cloud server 200, when it is the third time for determining whether or not the value of the acquired vibration-detection data is larger than a specified threshold value, the system-control unit 115 determines that the number of retries is greater than the limit number of times (step S104: YES). Then, processing moves to step S127 in FIG. 5 described later.

(Step S105)

The system-control unit 115 clears the vibration-detection-data-storage area 111*b*.

In this case, the system-control unit 115 suppresses a decrease in the storage area of the memory 111 by clearing the vibration-detection-data-storage area 111*b* of the memory 111.

Moreover, by clearing the vibration-detection-data-storage area 111*b* of the memory 111, the system-control unit 115 is able to avoid determination errors due to misreading the current vibration-detection data and past vibration-detection data.

(Step S106)

The system-control unit 115 sends a transmission request for job data to the cloud server 200.

In this case, when it is determined that the value of the acquired vibration-detection data of the vibration-detection sensor 102 is equal to or less than a specified threshold value, the system-control unit 115 determines that there is no problem in transmitting and receiving data, and sends a transmission request for job data to the cloud server 200.

(Step S107)

The system-control unit 115 determines whether or not job data is received.

In this case, when there is no notification from the communication-control unit 113 indicating that job data has been received, the system-control unit 115 determines that job data has not been received (step S107: NO).

However, when there is a notification from the communication-control unit 113 indicating that job data has been received, the system-control unit 115 determines that job data has been received (step S107: YES), and processing moves to step S108.

(Step S108)

The system-control unit 115 acquires vibration-detection data of the gateway 100 side.

In this case, the system-control unit 115, via the sensor-control unit 114, acquires vibration-detection data that is detected by the vibration-detection sensor 102.

Moreover, the system-control unit 115 stores the acquired vibration-detection data in the vibration-detection-data-storage area 111*b* of the memory 111.

(Step S109)

The system-control unit 115 determines whether or not the value of the acquired vibration-detection data is larger than a specified threshold value.

In this case, when the system-control unit 115 determines that the value of the acquired vibration-detection data is larger than a specified threshold value (step S109: YES), processing moves to step S110.

However, when the system-control unit 115 determines that the value of the acquired vibration-detection data is equal to or less than a specified threshold value, (step S109: NO), processing moves to step S112.

Here, determination of the value of the vibration-detection data is a process performed after receiving job data from the cloud server 200, and based on the value of the vibration-detection data on the gateway 100 side, this is a criterion for determining whether or not job data can be accurately received from the cloud server 200.

(Step S110)

The system-control unit 115 determines whether or not the number of retries is greater than the limit number of times.

In this case, in the stage after receiving job data from the cloud server 200, when it is the first time for determining whether or not the value of the acquired vibration-detection data is larger than a specified threshold value, the system-control unit 115 determines that the number of retries is not greater than the limit number of times (step S110: NO). Then, processing moves to step S111.

However, in the stage after receiving job data from the cloud server 200, when it is the third time for determining whether or not the value of the acquired vibration-detection data is larger than a specified threshold value, the system-control unit 115 determines that the number of retries is greater than the limit number of times (step S110: YES). Then, processing moves to step S126 in FIG. 5 described later.

(Step S111)

The system-control unit 115 clears the vibration-detection-data-storage area 111b.

In this case, the system-control unit 115 suppresses a decrease in the storage area of the memory 111 by clearing the vibration-detection-data-storage area 111b of the memory 111.

Moreover, by clearing the vibration-detection-data-storage area 111b of the memory 111, the system-control unit 115 is able to avoid determination errors due to misreading the current vibration-detection data and past vibration-detection data.

(Step S112)

The system-control unit 115 stores job data.

In this case, the system-control unit 115 stores job data that is received from the cloud server 200 in the job-data-storage area 111a of the memory 111.

(Step S113)

The system-control unit 115 acquires vibration-detection data of the gateway 100 side.

In this case, the system-control unit 115, via the sensor-control unit 114, acquires vibration-detection data that is detected by the vibration-detection sensor 102.

Moreover, the system-control unit 115 stores the acquired vibration-detection data in the vibration-detection-data-storage area 111b of the memory 111.

(Step S114)

The system-control unit 115 determines whether or not the value of the acquired vibration-detection data is larger than a specified threshold value.

In this case, when the system-control unit 115 determines that the value of the acquired vibration-detection data is larger than a specified threshold value (step S114: YES), processing moves to step S115.

However, when the system-control unit 115 determines that the value of the acquired vibration-detection data is equal to or less than a specified threshold value, (step S114: NO), processing moves to step S117 in FIG. 5 described later.

Here, determination of the value of the vibration-detection data is a process performed before transmitting job data from the cloud server 200 to the MFP 300. Here, determination of the value of the vibration-detection data, by being based on the value of the vibration-detection data on the gateway 100 side, is a criterion for determining whether or not job data from the cloud server 200 can be accurately transmitted to the MFP 300.

(Step S115)

The system-control unit 115 determines whether or not the number of retries is greater than the limit number of times.

In this case, in the stage before transmitting job data from the cloud server 200 to the MFP 300, when it is the first time for determining whether or not the value of the acquired vibration-detection data is larger than a specified threshold value, the system-control unit 115 determines that the number of retries is not greater than the limit number of times (step S115: NO). Then, processing moves to step S116.

However, in the stage before transmitting job data from the cloud server 200 to the MFP 300, when it is the third time for determining whether or not the value of the acquired vibration-detection data is larger than a specified threshold value, the system-control unit 115 determines that the number of retries is greater than the limit number of times (step S115: YES). Then, processing moves to step S126 in FIG. 5 described later.

(Step S116)

The system-control unit 115 clears the vibration-detection-data-storage area 111b.

In this case, the system-control unit 115 suppresses a decrease in the storage area of the memory 111 by clearing the vibration-detection-data-storage area 111b of the memory 111.

Moreover, as described above, by clearing the vibration-detection-data-storage area 111b of the memory 111, the system-control unit 115 is able to avoid determination errors due to misreading the current vibration-detection data and past vibration-detection data.

(Step S117)

The system-control unit 115 requests the MFP 300 to transmit vibration-detection data.

In this case, the system-control unit 115, via the communication control unit 113, requests the MFP 300 to transmit vibration-detection data.

Moreover, the system-control unit 115 stores the vibration-detection data that is received from the MFP 300 in the vibration-data-storage area 111b of the memory 111.

(Step S118)

The system-control unit 115 determines whether or not the value of the vibration-detection data acquired from the MFP 300 is greater than a specified threshold value.

In this case, when the system-control unit 115 determines that the value of the vibration-detection data on the MFP 300 side is greater than a specified threshold value (step S118: YES), processing moves to step S119.

However, when the system-control unit 115 determines that the value of the vibration-detection data on the MFP 300 side is equal to or less than a specified threshold value (step S118: NO), processing moves to step S121.

Here, determination of the value of the vibration-detection data is a process performed before transmitting job data from the cloud server 200 to the MFP 300. Here, determination of the value of the vibration-detection data, based on the value of the vibration-detection data on the MFP 300 side, is a criterion for determining whether or not job data from the cloud server 200 can be accurately transmitted to the MFP 300.

(Step S119)

The system-control unit 115 determines whether or not the number of retries is greater than the limit number of times.

In this case, in the stage before transmitting job data from the cloud server 200 to the MFP 300, when it is the first time for determining whether or not the value of the vibration-detection data on the MFP 300 side is larger than a specified threshold value, the system-control unit 115 determines that the number of retries is not greater than the limit number of times (step S119: NO). Then, processing moves to step S120.

However, in the stage before transmitting job data from the cloud server 200 to the MFP 300, when it is the third time for determining whether or not the value of the vibration-detection data on the MFP 300 side is larger than a specified threshold value, the system-control unit 115 determines that the number of retries is greater than the limit number of times (step S119: YES). Then, processing moves to step S126.

(Step S120)

The system-control unit 115 clears the vibration-detection-data-storage area 111b.

In this case, the system-control unit 115 suppresses a decrease in the storage area of the memory 111 by clearing the vibration-detection-data-storage area 111b of the memory 111.

Moreover, as described above, by clearing the vibration-detection-data-storage area 111b of the memory 111, the system-control unit 115 is able to avoid determination errors due to misreading the current vibration-detection data and past vibration-detection data.

(Step S121)

The system-control unit 115 transmits job data to the MFP 300.

In this case, the system-control unit 115, via the communication-control unit 113, transmits job data to the MFP 300.

(Step S122)

The system-control unit 115 acquires vibration-detection data of the gateway 100 side.

In this case, the system-control unit 115, via the sensor-control unit 114, acquires vibration-detection data that is detected by the vibration-detection sensor 102.

Moreover, the system-control unit 115 stores the acquired vibration-detection data in the vibration-detection-data-storage area 111b of the memory 111.

(Step S123)

The system-control unit 115 determines whether or not the value of the acquired vibration-detection data is greater than a specified threshold value.

In this case, when the system-control unit 115 determines that the value of the acquired vibration-detection data is greater than a specified threshold value (step S123: YES), processing moves to step S124.

However, when the system-control unit 115 determines that the value of the acquired vibration-detection data is equal to or less than a specified threshold value (step S123: NO), processing moves to step S126.

Here, determination of the value of the vibration-detection data is a process performed after transmitting job data from the cloud server 200 to the MFP 300. Here, determination of the value of the vibration-detection data, by being based on the value of the vibration-detection data on the gateway 100 side, is a criterion for determining whether or not job data from the cloud server 200 is accurately transmitted to the MFP 300.

(Step S124)

The system-control unit 115 determines whether or not the number of retries is greater than the limit number of times.

In this case, in the stage after transmitting job data from the cloud server 200 to the MFP 300, when it is the first time for determining whether or not the value of the acquired vibration-detection data is larger than a specified threshold value, the system-control unit 115 determines that the number of retries is not greater than the limit number of times (step S124: NO). Then, processing moves to step S125.

However, in the stage after transmitting job data from the cloud server 200 to the MFP 300, when it is the third time for determining whether or not the value of the acquired vibration-detection data is larger than a specified threshold value, the system-control unit 115 determines that the number of retries is greater than the limit number of times (step S124: YES). Then, processing moves to step S126.

(Step S125)

The system-control unit 115 clears the vibration-detection-data-storage area 111b.

In this case, the system-control unit 115 suppresses a decrease in the storage area of the memory 111 by clearing the vibration-detection-data-storage area 111b of the memory 111.

Moreover, as described above, by clearing the vibration-detection-data-storage area 111b of the memory 111, the system-control unit 115 is able to avoid determination errors due to misreading the current vibration-detection data and past vibration-detection data.

(Step S126)

The system-control unit 115 clears the job-data-storage area 111a.

In this case, the system-control unit 115 suppresses a decrease in the storage area of the memory 111 by clearing the job-data-storage area 111a of the memory 111.

Moreover, by clearing the job-data-storage area 111a of the memory 111, the system-control unit 115 is able to avoid errors in transmitting job data to the MFP 300.

(Step S127)

The system-control unit 115 clears the vibration-detection-data-storage area 111b.

In this case, the system-control unit 115 suppresses a decrease in the storage area of the memory 111 by clearing the vibration-detection-data-storage area 111b of the memory 111.

Moreover, as described above, by clearing the vibration-detection-data-storage area 111b of the memory 111, the system-control unit 115 is able to avoid determination errors due to misreading the current vibration-detection data and past vibration-detection data.

In step S104, when the number of retries is greater than the limit number of times, the system-control unit 115 clears the vibration-detection-data-storage area 111b in step S127, and then waits until the value of the vibration-detection data of the vibration-detection sensor 102 becomes equal to or less than a specified threshold value. Then, in step S102, the system-control unit 115 may re-acquire the vibration-detection data of the vibration-detection sensor 102, and in step S103, may again determine whether or not the value of the vibration-detection data is greater than a specified threshold value.

Moreover, in steps S110 and S115, when the number of retries is greater than the limit number of times, the system-control unit 115 clears the vibration-detection-data-storage area 111b and the job-data-storage area 111a in steps S126 and S127, and then waits until the value of the vibration-detection data of the vibration-detection sensor 102 becomes equal to or less than a specified threshold value. Then, when the value of the vibration-detection data becomes equal to or less than a specified threshold value, the system-control unit 115 in step S106 may again send a transmission request for job data to the cloud server 200.

Furthermore, in steps S119 and S124, when the number of retries is greater than the limit number of times, the system-control unit 115 clears the vibration-detection-data-storage area 111b and the job-data-storage area 111a in steps S126 and S127, and then waits until the values of the vibration-detection sensors 102, 303 become equal to or less than a specified threshold value. Then, when the values of the respective vibration-detection data becomes equal to or less than a specified threshold value, the system-control unit 115 in step S121 may again transmit job data to the MFP 300.

In this way, in this embodiment, the cloud server 200 (server) transmits job data. Then, the vibration-detection sensor 102 (first vibration-detection sensor) of the gateway 100 (relay apparatus) detects vibration that is applied to the gateway 100 (relay apparatus). The vibration-detection sensor 303 (second vibration-detection sensor) of the MFP 300 then detects vibration that is applied to the MFP 300 (image forming apparatus). Then, the gateway 100 (relay apparatus) stores the job data that is received from the cloud server 200 (server) in the memory 111 (first storage device) of the gateway 100 (relay apparatus), and then transmits the job data to the MFP 300 (image forming apparatus). Moreover, the MFP 300 (image forming apparatus) transmits vibration-detection data of the vibration-detection sensor 303 (second vibration-detection sensor) to the gateway 100 (relay apparatus) in accordance with a request from the gateway 100 (relay apparatus). Then, when the value of the vibration-detection data of the vibration detection-sensor 102 (first vibration-detection sensor) is equal to or less than a specified threshold value, the gateway 100 (relay apparatus) receives job data from the cloud server 200 (server) and stores the job data in the memory 111 (first storage device). Furthermore, when the value of the vibration-detection data of the vibration-detection sensor 303 (second vibration-detection sensor) is equal to or less than a specified threshold value, the gateway 100 (relay apparatus) transmits the job data that is stored in the memory 111 (first storage device) to the MFP 300 (image forming apparatus).

In this way, when the values of the vibration-detection data of the vibration-detection sensor 102 and the vibration-detection sensor 303 are equal to or less than a specified threshold value when receiving job data from the cloud server 200 and when transmitting job data to the MFP 300, the gateway 100 sets transmitting and receiving of job data. Therefore, it is possible to detect and predict the stability of transmitting and receiving job data, and thus it is possible to accurately perform transmitting and receiving of job data.

When there are plural vibration-detection sensors 102 installed in the gateway 100, the sensor-control unit 114 may notify the system-control unit 115 of the vibration-detection data that is detected by each of the plural vibration-detection sensors 102.

Figure 4:
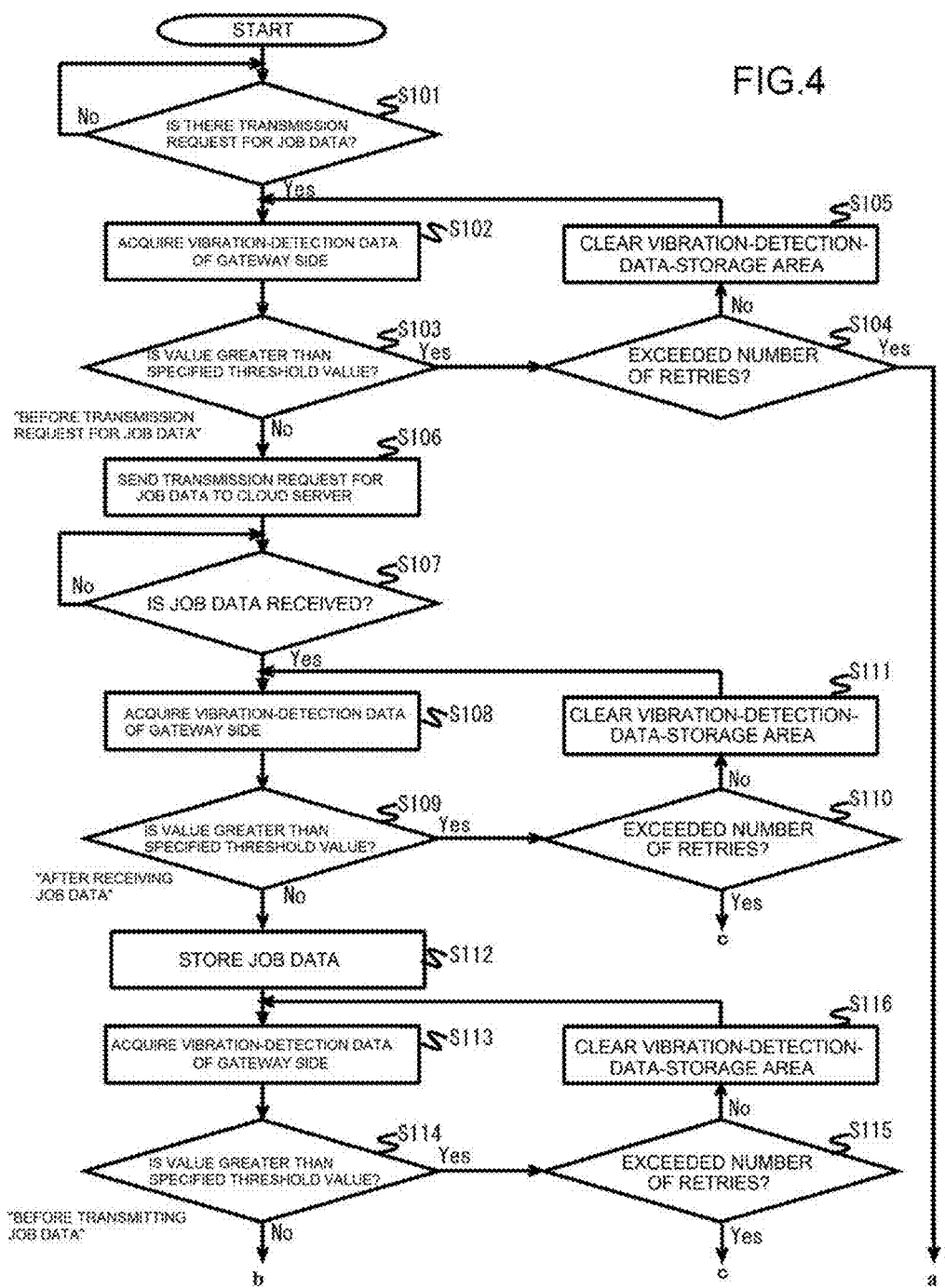
FIG. 4 is a flowchart for explaining the data transmission method in the data transmission system in FIG. 1.

In this case, in steps S102, S108, and S113 illustrated in FIG. 4, and step S122 illustrated in FIG. 5, the system-control unit 115 may store each of the respective acquired vibration-detection data in the vibration-detection-data-storage area 111*b* of the memory 111. Alternatively, in steps S102, S108, and S113 illustrated in FIG. 4, and step S122 illustrated in FIG. 5, the system-control unit 115 may store a statistical value (average value, maximum value or the like) of each of the acquired vibration-detection data as representative vibration-detection data in the vibration-detection-data-storage area 111*b* of the memory 111.

Moreover, when there are plural vibration-detection sensors 102 installed in the gateway 100, the sensor-control unit 114 may notify the system-control unit 115 of a statistical value (for example, average value, maximum value or the like) of the vibration-detection data that is detected by each of the plural vibration-detection sensors 102, as representative vibration-detection data.

Furthermore, the case is explained in which the system-control unit 115 stores vibration-detection data that is detected by each of the vibration-detection sensors 102 in the vibration-detection-data-storage area 111*b*. In steps S103, S109 and S114 illustrated in FIG. 4, and in step S123 illustrated in FIG. 5, it may be determined for each of the vibration-detection data whether or not the value of the vibration-detection data is greater than a specified threshold value. Alternatively, the case is explained in which the system-control unit 115 stores the vibration-detection data that is detected by each of the plural vibration-detection sensors 102 in the vibration-detection-data-storage area 111*b*. In steps S103, S109 and S114 illustrated in FIG. 4, and in step S123 illustrated in FIG. 5, it may be determined whether or not the value of a statistical value (average value, maximum value or the like) of the vibration-detection data is greater than a specified threshold value.

Moreover, when plural vibration-detection sensors 303 are installed in the MFP 300, the sensor-control unit 316 may notify the system-control unit 319 of the vibration-detection data that is detected by each of the plural vibration-detection sensors 303.

In this case, in step S117 illustrated in FIG. 5, the system-control unit 115 of the gateway 100 may store each of the received vibration-detection data in the vibration-detection-data-storage area 111*b* of the memory 111. Alternatively, in step S117 illustrated in FIG. 5, the system-control unit 115 may store a statistical value (average value, maximum value or the like) of each of the received vibration-detection data as representative vibration-detection data in the vibration-detection-data-storage area 111*b*.

Moreover, when plural vibration-detection sensors 303 are installed in the MFP 300, the sensor-control unit 316 may notify the system control unit 319 of a statistical value (for example, average value, maximum value, or the like) of the vibration-detection data that is detected by each of the plural vibration-detection sensors 303 as representative vibration-detection data.

Furthermore, the case is explained in which the system-control unit 115 stores the vibration-detection data that is detected by each of the plural vibration-detection sensors 303 in the vibration-detection-data-storage area 111*b*. In step S118 illustrated in FIG. 5 the system-control unit 115 it may determined for each of the respective vibration-detection data whether or not the value of the vibration-detection data is greater than a specified threshold value. Alternatively, the case is explained in which the system-control unit 115 stores the vibration-detection data that is detected by each of the plural vibration-detection sensors 303 in the vibration-detection-data-storage area 111*b*. In step S118 illustrated in FIG. 5, it may be determined whether or not the value of a statistical value (average value, maximum value or the like) of the vibration-detection data is greater than a specified threshold value.

Moreover, a limit number of times for the number of retries may be provided for each of the determinations made in steps S103, S109 ad S114 illustrated in FIG. 4, and steps S118 and S123 illustrated in FIG. 5. Alternatively, the limit number of times may be for the number of retries of each of the determinations made in steps S103, S109 ad S114 illustrated in FIG. 4, and steps S118 and S123 illustrated in FIG. 5. Alternatively, the limit number of times may be for the total number of retries of determination of whether or not the vibration-detection data that is detected by the vibration-detection sensor 102 is greater than a specified threshold value. This total number of retries may be the number of times of determination in steps S103, S109 ad S114 illustrated in FIG. 4, and step S123 illustrated in FIG. 5. Moreover, this limit number of times may be for the number of retries (step S123 in FIG. 5) of determining whether or not the vibration-detection data detected by the vibration-detection sensor 102 is greater than a threshold value. In either case, the limit number of times must be set to a value that is equal to or greater than the number of corresponding determination steps.

In an image forming apparatus in the typical technology described above, when a vibration-detection sensor detects vibration, the information storage destination is switched from the HDD to a nonvolatile memory, so it is possible to eliminate problems in the HDD due to vibration without being limited by the apparatus design.

However, in this image forming apparatus, although it is possible to save information, it is not possible to perform detection and estimation of the stability of transmitting and receiving data due to the occurrence of troubles due to vibration at each of the sites of the main body, HDD and the like of the image forming apparatus. When it is not possible to perform detection and estimation of the stability of transmitting and receiving data in this way, there is a possibility that it will not be possible to accurately transmit and receive data between the image forming apparatus and an external apparatus such as a cloud server, for example.

With the data transmission system and data transmission method according to the present disclosure, transmitting and receiving of job data is set by performing detection and estimation of the stability of transmitting and receiving job data when the relay apparatus performs receiving of job data from the server, and transmitting of job data to an image forming apparatus. Therefore it is possible to accurately perform transmitting and receiving of job data.

What is claimed is:

1. A data transmission system comprising a server, a relay apparatus, and an image forming apparatus, wherein:
    the server is configured to transmit job data to the relay apparatus;
    the relay apparatus has a first storage device and a first vibration-detection sensor;
    the image forming apparatus has a second vibration-detection sensor;
    the first vibration-detection sensor is configured to detect vibration that is applied to the relay apparatus;
    the second vibration-detection sensor is configured to detect vibration that is applied to the image forming apparatus;
    the relay apparatus is configured such that, when the value of vibration-detection data of the first vibration-detection sensor is equal to or less than a specified threshold value, the relay apparatus sends a request to the server for the server to transmit the job data to the relay apparatus and the relay apparatus receives the job data from the server;
    the relay apparatus is configured such that, when the value of the vibration-detection data of the first vibration detection sensor exceeds the specified threshold value, the relay apparatus does not send the request to the server;
    the image forming apparatus is configured to transmit vibration-detection data of the second vibration-detection sensor to the relay apparatus in accordance with a request from the relay apparatus;
    the relay apparatus is configured to store the job data that is received from the server in the first storage device, and then, when the value of vibration-detection data of the second vibration sensor is equal to or less than a specified value, transmit the job data that is stored in the first storage device to the image forming apparatus; and
    the relay apparatus is configured to, when the value of the vibration-detection data of the second vibration detection sensor exceeds the specified value, not transmit the job data to the image forming apparatus.

2. The data transmission system according to claim 1 wherein
    the relay apparatus is configured to, when the value of vibration-detection data of the first vibration-detection sensor is greater than a specified threshold value after job data is received from the server, receive job data from the server again after the value of vibration detection data of the first vibration-detection sensor becomes equal to or less than a specified threshold value.

3. The data transmission system according to claim 1 wherein
    the relay apparatus is configured to, when the value of vibration-detection data of the first vibration-detection sensor is equal to or less than a specified threshold vale after the job data is received from the server, transmit the job data to the image forming apparatus.

4. The data transmission system according to claim 1 wherein
    the relay apparatus is configured to, when the value of vibration-detection of the first vibration-detection sensor is greater than a specified threshold value after the job data is transmitted to the image forming apparatus, transmit the job data to the image forming apparatus again after the value of vibration-detection data of the first vibration-detection sensor becomes equal to or less than a specified threshold value.

5. A data transmission method comprising:
    detecting, via a first vibration-detection sensor of a relay apparatus, vibration that is applied to the relay apparatus;
    detecting, via a second vibration-detection of an image forming apparatus, vibration that is applied to the image forming apparatus;
    when the value of vibration-detection data of the first vibration-detection sensor is equal to or less than a specified threshold value, sending, via the relay apparatus, a request to a server for the server to transmit job data to the relay apparatus and receiving, via the relay apparatus, the job data from the server,
    storing, via the relay apparatus, the job data that is received from the server in a first storage device of the relay apparatus;
    when the value of the vibration-detection data of the first vibration detection sensor exceeds the specified threshold value, not sending, via the relay apparatus, the request to the server;
    transmitting, via the image forming apparatus, vibration-detection data of the second vibration-detection sensor to the relay apparatus in accordance with a request from the relay apparatus;
    when the value of vibration-detection data of the second vibration sensor is equal to or less than a specified value, transmitting, via the relay apparatus, the job data that is stored in the first storage apparatus to the image forming apparatus; and
    when the value of the vibration-detection data of the second vibration detection sensor exceeds the specified value, not transmitting, via the relay device, the job data to the image forming apparatus.

\* \* \* \* \*